(12) United States Patent
Hall et al.

(10) Patent No.: US 11,363,764 B2
(45) Date of Patent: Jun. 21, 2022

(54) PLANT GROW UNIT

(71) Applicant: Danby Products Limited, Guleph (CA)

(72) Inventors: Gregory Allan Thomas Hall, Guelph (CA); Jim Estill, Guelph (CA)

(73) Assignee: Danby Products Limited, Guelph (CA)

( * ) Notice: Subject to any disclaimer, the term of this patent is extended or adjusted under 35 U.S.C. 154(b) by 631 days.

(21) Appl. No.: 16/225,131

(22) Filed: Dec. 19, 2018

(65) Prior Publication Data
US 2019/0200542 A1    Jul. 4, 2019

Related U.S. Application Data

(60) Provisional application No. 62/612,851, filed on Jan. 2, 2018.

(51) Int. Cl.
| | | |
|---|---|---|
| *A01G 9/26* | (2006.01) | |
| *A01G 7/02* | (2006.01) | |
| *A01G 7/04* | (2006.01) | |
| *A01G 29/00* | (2006.01) | |
| *A01G 9/20* | (2006.01) | |
| *A01G 9/24* | (2006.01) | |
| *A01G 25/16* | (2006.01) | |
| *A01G 9/18* | (2006.01) | |

(52) U.S. Cl.
CPC ............. *A01G 9/26* (2013.01); *A01G 7/02* (2013.01); *A01G 7/045* (2013.01); *A01G 9/18* (2013.01); *A01G 9/20* (2013.01); *A01G 9/246* (2013.01); *A01G 9/247* (2013.01); *A01G 25/167* (2013.01); *A01G 29/00* (2013.01)

(58) Field of Classification Search
CPC ... A05G 9/18; A05G 9/20; A05G 9/24; A05G 9/246; A05G 9/247; A05G 9/249; A05G 9/26; A05G 7/02; A05G 7/04; A05G 7/045; A05G 25/16; A05G 25/165; A05G 25/167

See application file for complete search history.

(56) References Cited

U.S. PATENT DOCUMENTS

| 8,910,419 B1 * | 12/2014 | Oberst | A01G 31/06 47/60 |
|---|---|---|---|
| 10,455,777 B1 * | 10/2019 | Dennison | A01G 7/045 |

(Continued)

OTHER PUBLICATIONS

"Trol Systems T6", www.trolsystems.com/trol20031.htm (Year: 2003).*

(Continued)

*Primary Examiner* — Michael H Wang
(74) *Attorney, Agent, or Firm* — Ralph E. Jocke; Walker & Jocke

(57) ABSTRACT

A plant grow unit (10) includes a body (12) that bounds an interior area (14). Access to the interior area is controlled by a door (18). The interior area houses a plurality of grow lights (50) which are selectively operated in response to at least one control circuit (96) to provide suitable illumination and radiation for growing selected plants. Shelves (46, 48) are selectively positionable for supporting plants thereon. A plurality of sensors and devices in the interior area are operated responsive to the control circuit to maintain desired conditions for plant growth within the interior area and to indicate detected conditions.

33 Claims, 9 Drawing Sheets

(56) References Cited

U.S. PATENT DOCUMENTS

| | | | |
|---|---|---|---|
| 2003/0005626 A1* | 1/2003 | Yoneda | A01G 9/249 47/69 |
| 2003/0193709 A1* | 10/2003 | Mallya | G02F 1/13718 359/245 |
| 2014/0318012 A1* | 10/2014 | Fujiyama | A01G 9/249 47/62 R |
| 2015/0047254 A1* | 2/2015 | Jiang | A01G 9/26 47/17 |
| 2017/0094920 A1* | 4/2017 | Ellins | A01G 31/02 |
| 2018/0184602 A1* | 7/2018 | Ofir | A01G 31/02 |
| 2018/0359946 A1* | 12/2018 | Rossi | A01G 9/247 |
| 2019/0059241 A1* | 2/2019 | Bogner | A01G 9/18 |
| 2019/0183062 A1* | 6/2019 | Pham | A01G 31/06 |
| 2019/0261589 A1* | 8/2019 | Pham | A01G 9/0297 |
| 2020/0037514 A1* | 2/2020 | Massey | A01G 9/249 |

OTHER PUBLICATIONS

"Discover Zelio Soft", <https://www.se.eom/US/en/product-range/542-zelio-soft/#overview> (Year: 2011).*

\* cited by examiner

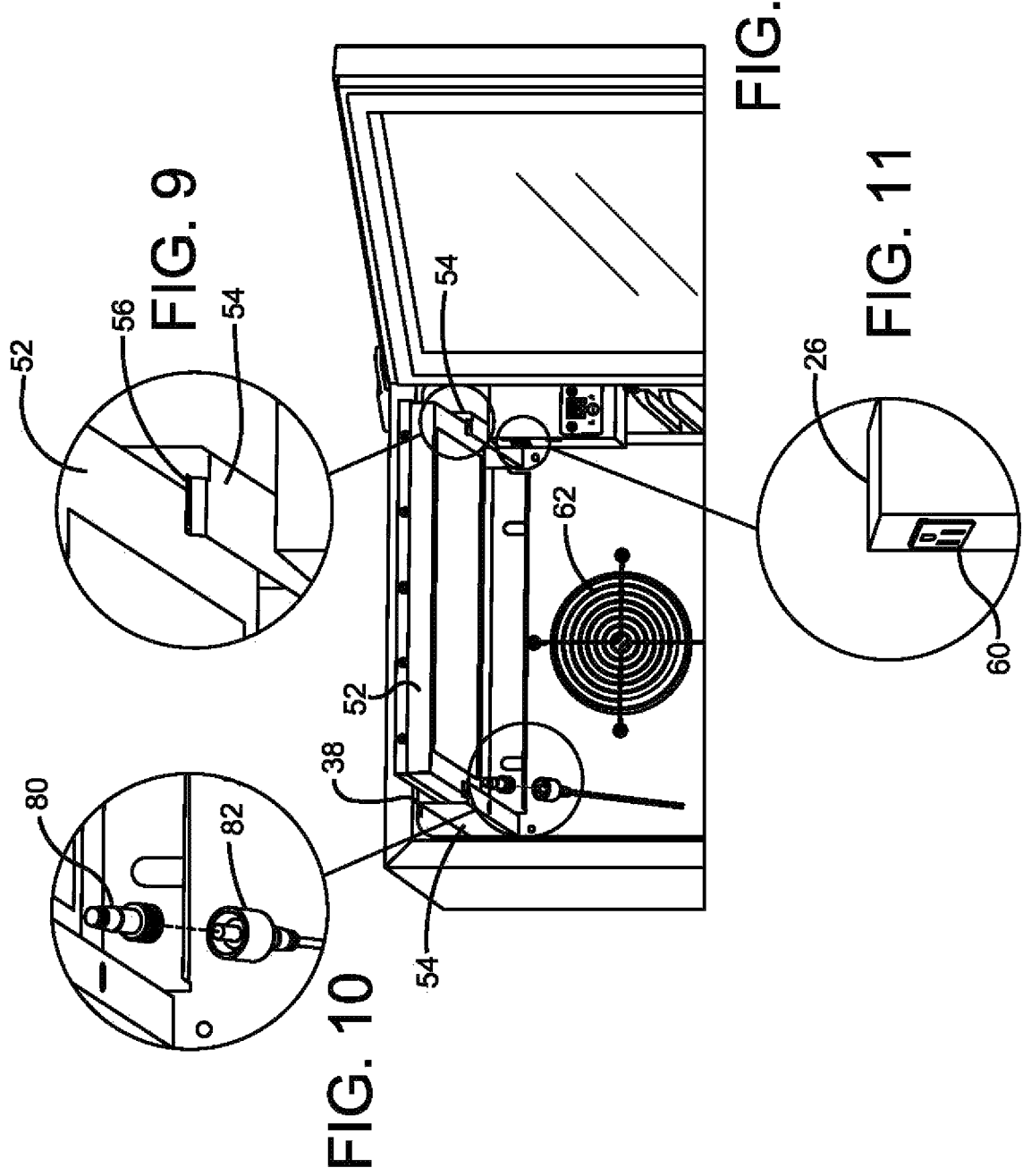

PLANT GROW UNIT

TECHNICAL FIELD

Exemplary embodiments relate to a plant grow unit which is usable for growing plants under controlled conditions.

BACKGROUND

Many persons enjoy gardening as a hobby. Such individuals often live in climates where the growing season is not sufficiently long to grow plants outside from seeds. Such persons often begin growing plants from seeds indoors during the winter or early spring. The plants are then transplanted to an outdoor environment once the weather has warmed.

Other people grow special or exotic plants. Such exotic plants may include prize-winning vegetables, pumpkins, flowers or other items for which the seeds and plants are valuable. Some persons grow plants that require conditions that are not normally available in a household or local outdoor environment. Other persons try to control the environment in which the plant is grown in order to achieve desirable properties such as fast growth, plant blooms at desired times or other features. Other persons may wish to grow plants in a controlled environment for purposes of desired plant breeding and cross-pollination. Various approaches and techniques are used for these purposes.

Devices and systems used for controlled growth of plants may benefit from improvements.

SUMMARY OF DISCLOSURE

Exemplary embodiments described herein include a plant grow unit which may be used by gardeners and other individuals to grow plants under controlled conditions. Exemplary plant grow units include features that enable the control of numerous properties of the unit environment in which the plants are grown. Exemplary embodiments of the plant grow unit also provide additional features, including features that enable monitoring and maintaining control over the environment within the unit, as well as providing for security features that prevent unauthorized access to the plants in the unit.

BRIEF DESCRIPTION OF DRAWINGS

FIG. 8 is a perspective view of an upper portion of the interior area of the plant grow unit.

FIG. 9 is an enlarged view of the interior area showing a projection and recess arrangement that supports a grow light assembly including a plurality of grow lights.

FIG. 10 is an enlarged view of a temperature sensor and a connector associated therewith.

FIG. 11 is an enlarged view of an electrical outlet associated with an enclosure that houses the display and input devices of the unit.

DETAILED DESCRIPTION OF EXEMPLARY EMBODIMENTS

Figure 1:
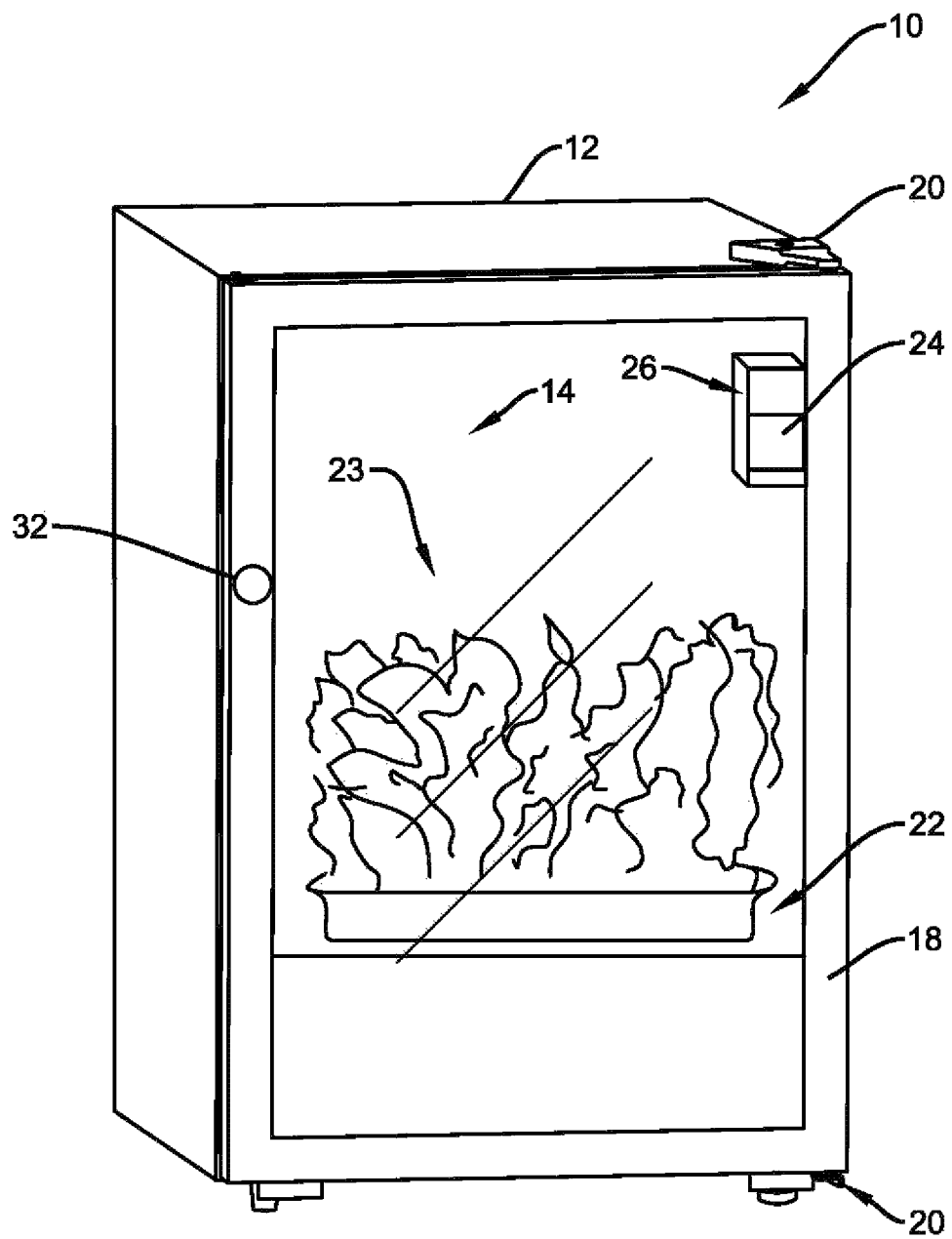
FIG. 1 is a front perspective view of an exemplary embodiment of a plant grow unit, with the door of the unit in a closed position.

Referring now to the drawings and particularly FIG. 1 there is shown therein an exemplary plant grow unit generally indicated 10. The exemplary plant grow unit includes a body 12. The body 12 bounds an interior area 14. The interior area 14 is bounded by the body on a top side, a bottom side, a back side and opposed lateral sides. The body includes an opening 16 at the front thereof to the interior area.

Figure 2:
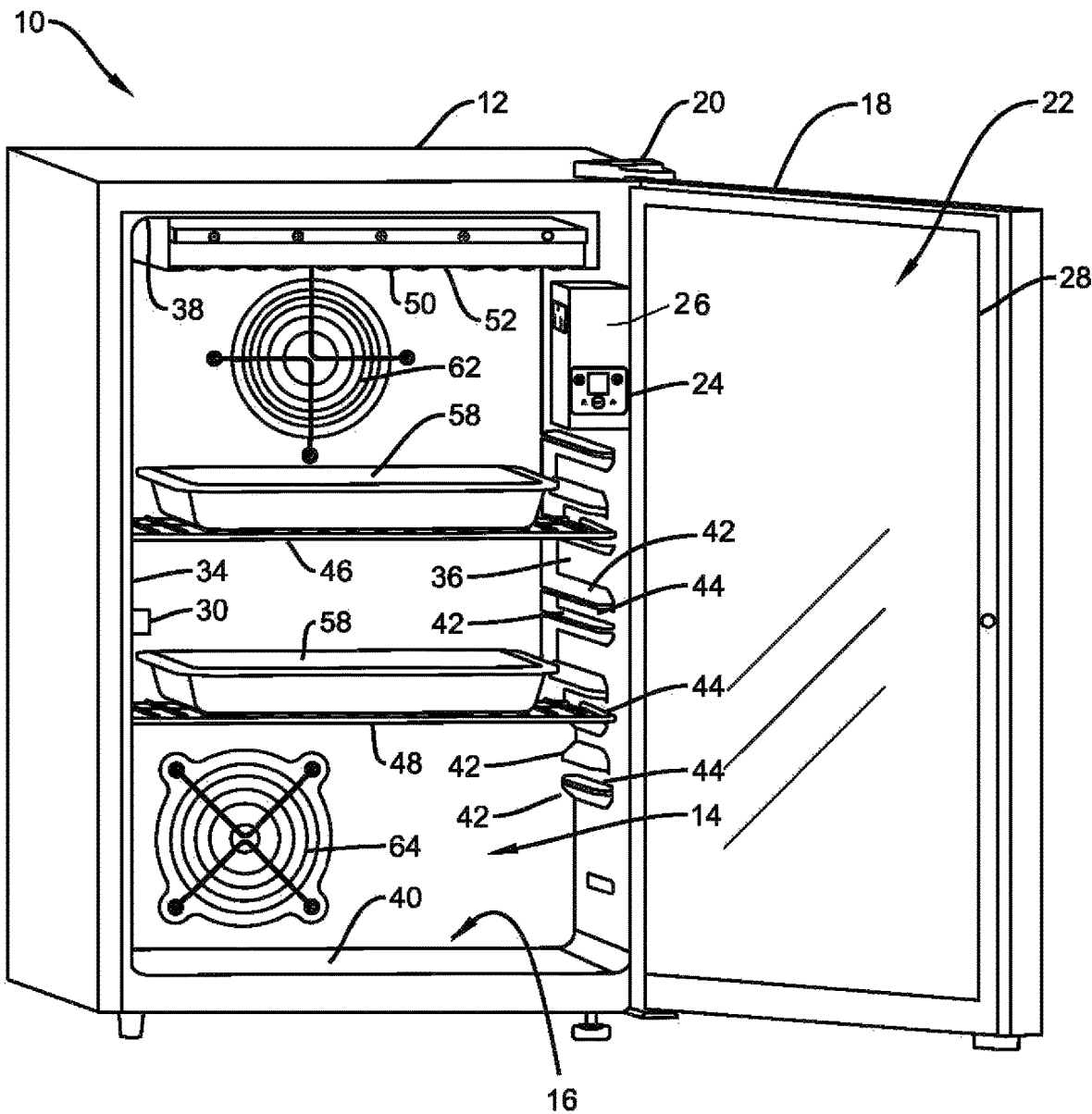
FIG. 2 is a perspective view of the plant grow unit with the door in an open position.
Figure 3:
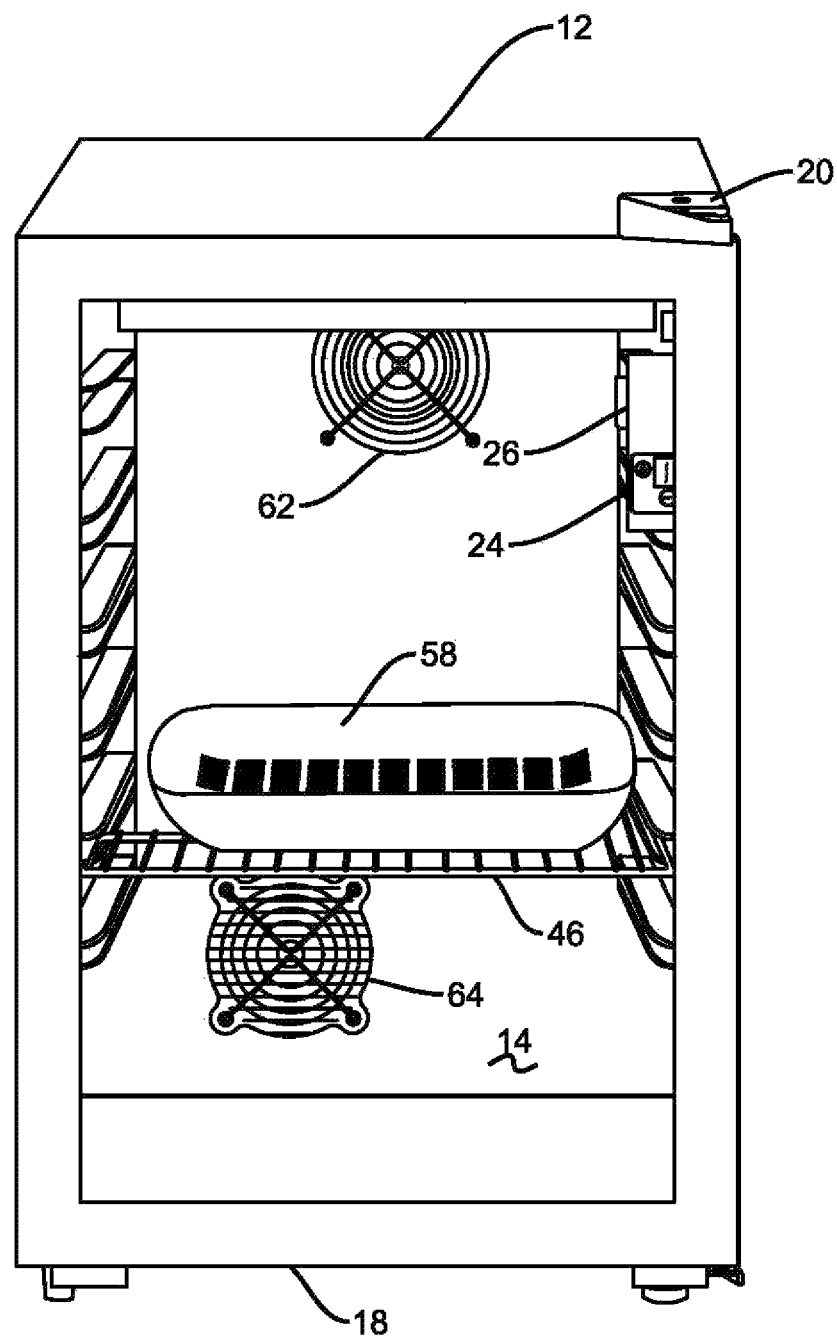
FIG. 3 is a front perspective view of the plant grow unit showing the interior area the unit through a transparent window in the door.
Figure 4:
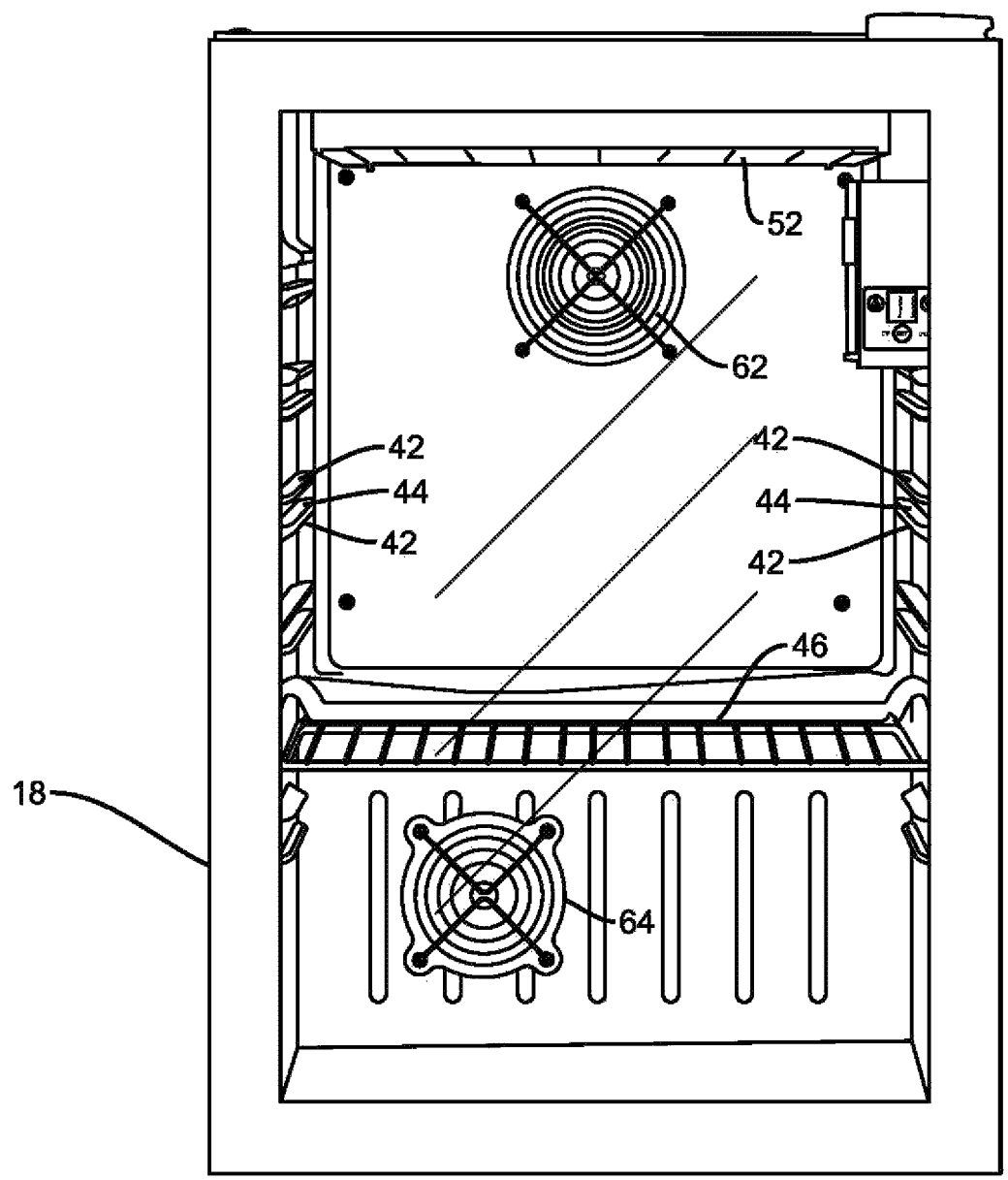
FIG. 4 is a front view of the exemplary plant grow unit.
Figure 5:
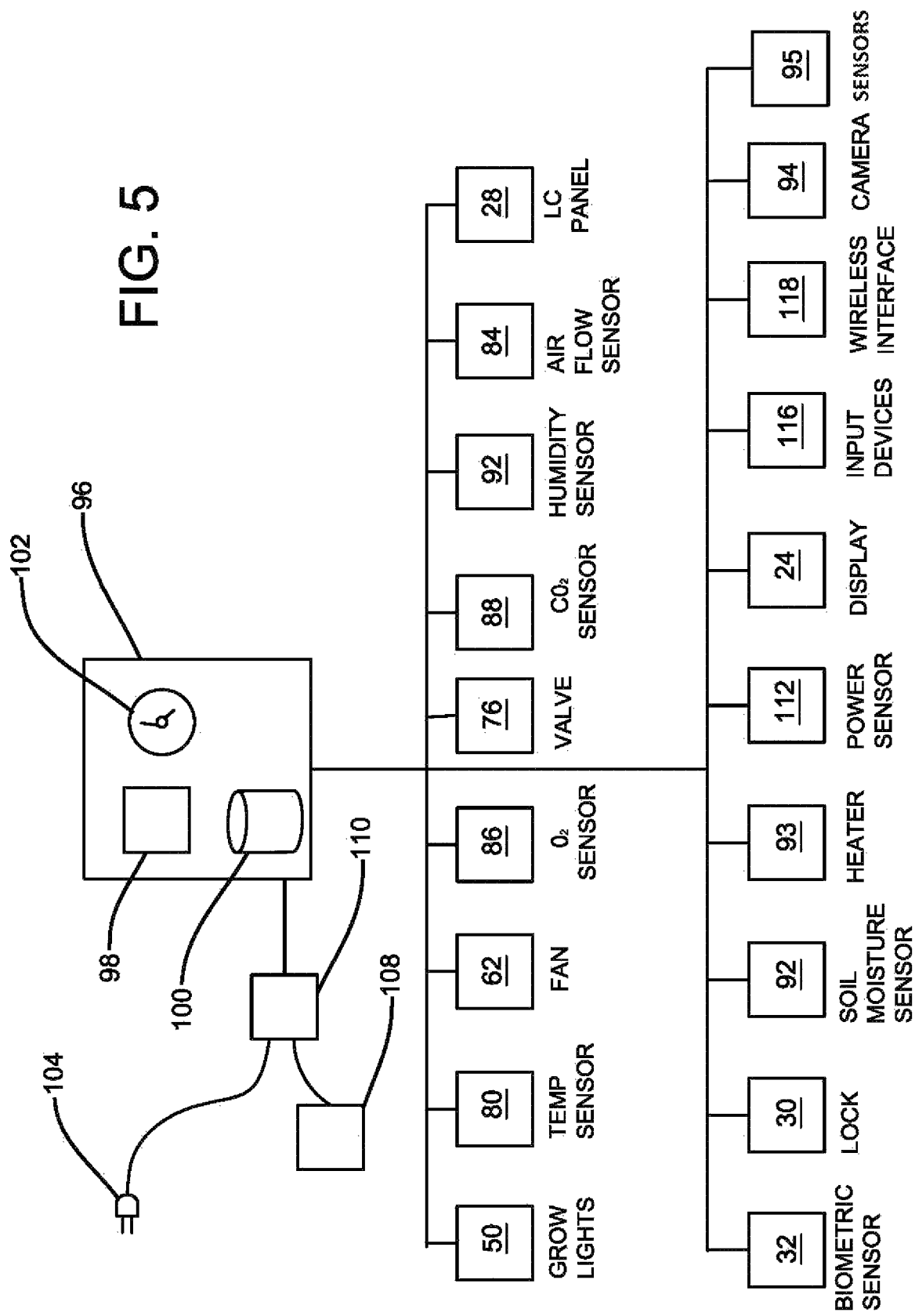
FIG. 5 is a schematic view of the circuitry associated with the exemplary plant grow unit.

A door 18 is movably mounted in operatively supported connection with the body 12. In the exemplary arrangement hinges 20 connect the body 12 and the door 18 so that the door is movable relative to the body. The exemplary door is movable to a closed position shown in FIG. 1 in which the door 18 covers the opening 16. In the closed position of the door 18 the interior area 14 is not accessible from outside the body 12. The door is movable to an open position such as is shown in FIG. 2. In the open position the door 18 is disposed away from the opening 16 which enables the interior area 14 to be accessed from outside the body.

The exemplary door includes a transparent window 22 therein. In the exemplary arrangement the transparent window enables viewing the interior area 14 of the grow unit when the door is in the closed position. This includes plants 23 that may be growing therein. In the exemplary arrangement the transparent window in the closed position of the door also enables viewing outputs from a display 24 which is positioned on a housing 26 within the interior area. As later discussed in detail the display 24 may output information such as interior area temperature, humidity, air flow rate, oxygen level, carbon dioxide level, soil moisture level, soil pH, aroma values, status of devices and other information that may be useful to the operator of the plant grow unit. In an exemplary arrangement the transparent window 22 is in generally overlying relation with a transparency panel 28. In the exemplary arrangement the transparency panel 28 is a liquid crystal containing panel that is electrically changeable between generally transparent and nontransparent conditions.

In the exemplary arrangement the door 18 is associated with a lock 30. In the exemplary arrangement the lock 30 is an electronic lock that is changeable responsive to electrical signals. The exemplary lock is changeable between an unlocked condition in which the door 18 is enabled to be moved from the closed position to an open position so a user may access the interior area, and a locked condition in which the door is held in the closed position. In the exemplary arrangement the exterior of the door includes at least one input device 32. The at least one input device is usable to provide user inputs that can change the condition of the lock between the locked condition and the unlocked condition. In some exemplary arrangements the input device 32 comprises a biometric sensor which is operative to receive a biometric input that identifies the user. In some exemplary arrangements the biometric sensor may include a fingerprint reader for example. In some exemplary arrangements the grow unit may be configured so that only an authorized user that is identified as authorized to access the interior area through a biometric input is enabled to change the condition of the lock to the unlocked condition. Of course this approach is exemplary, and in other embodiments other types of input devices that can be used to control the condition locking mechanisms may be used such as key cylinders for key locks, dials or keypads for combination locks, keypad code input locks, radiofrequency (RF) input locks or other types of locks that respond to different types of inputs. Further it should be understood that in some exemplary arrangements the door may not be associated with a locking mechanism so that it can be opened by anyone.

As shown in FIG. 2 the exemplary grow unit 10 has an interior area 14 that is bounded by a pair of opposed side walls 34, 36. The interior area is also bounded by a top wall 38 and a bottom wall 40. Each side wall 34, 36 includes a plurality of vertically spaced horizontally elongated projections 42. The projections in the exemplary embodiment are arranged in pairs and bound horizontally elongated recesses 44 which extend between each pair of projections 42.

In the exemplary arrangement shelves 46, 48 are removably positionable in engagement with respective recesses 44. In exemplary arrangements each shelf is sized such that the lateral ends thereof are engaged in a respective recess 44 in each sidewall, such that the shelf is supported on each side by an adjacent projection 42 below the recess. In the exemplary arrangement each of the shelves 46, 48 may be selectively positioned in different vertical locations within the interior area 14. The exemplary shelves are configured to support a tray 58 in which plants can be grown. Of course it should be understood that this arrangement of vertically spaced projections and recesses is exemplary of arrangements which may be utilized for purposes of supporting shelves and other items within the interior area of the grow unit. In other embodiments numerous different types of arrangements of projections or recesses or combinations thereof or differing configurations and extending on or within different structures of the grow unit may be utilized to engage components which provide support for shelves and other grow unit components.

In the exemplary arrangement a plurality of grow lights 50 are housed in a grow light assembly 52. In the exemplary arrangement the grow lights 50 are of a type that provide light with an intensity and spectral makeup that facilitates and stimulates the growth of plants that are to be housed in the interior area. Such grow lights may include for example high intensity discharge lights, metal halide lights, high pressure sodium lights, combination metal halide and high pressure sodium lamps, ceramic metal halide lights, fluorescent lights, light emitting diodes or combinations thereof depending on the nature and size of the grow units and the type of plants. In the exemplary arrangement the grow light assembly 52 houses a plurality of grow lights that illuminate in a downward direction toward the shelves in the interior area. As can be appreciated the ability to selectively position the shelves vertically within the interior area enables positioning the shelves and the plants supported thereby a selected distance away from the grow lights in the assembly.

As shown in FIGS. 8 and 9 in the exemplary arrangement the grow light assembly 52 is in operative supported connection with the top wall 38. In the exemplary arrangement shown, a pair of downwardly and inwardly extending projections 54 extend from the top wall 38 on each side of the grow unit. The projections 54 are spaced so that the grow light assembly 52 may be movably positioned in a recess between the projections. Upward extending tabs 56 extend at the front of each projection 54. The tabs serve to hold the grow light assembly 52 in operative position in engagement with the laterally inward extending portions of projections 54. In the exemplary arrangement the grow light assembly is enabled to be disengaged from the projections 54 by moving the assembly upwardly and then outwardly through the opening 16. This may be useful for repairing or replacing the grow light assembly 52. In exemplary arrangements the grow light assembly is electrically connected to a source of electrical power in the interior area of the unit through a power cord (not shown).

While in the embodiment of the grow unit shown in FIGS. 2 and 8 includes only one grow light assembly, alternative arrangements may include additional grow lights or grow light assemblies. For example, in some exemplary arrangements the grow light assemblies may be fitted with laterally extending projections similar to those at the sides of the shelves 46, 48 which can be engaged in the recesses 44. In such embodiments a plurality of grow light assemblies may be installed at various vertical locations within the interior area. In such arrangements the grow light assemblies may be vertically disposed a selected distance above an underlying shelf which supports a plant tray 58 thereon. Thus in some exemplary arrangements numerous grow light assemblies and associated plant trays 58 housing soil or other grow media and seeds or plants may be housed within the assembly. Further this approach may enable using different types of grow lights which may output different frequencies or have other properties that are better tailored to the types or stages of plants being grown in the underlying trays within the single interior area.

As represented in FIG. 11 some exemplary arrangements may include a plurality of electrical receptacles 60 within the interior area of the unit for purposes of connecting a plurality of grow light assembly units therein. In some arrangements each of the electrical receptacles may be controlled through control circuitry like that later discussed, to provide different time periods or other properties of illumination which is programmed to suit the particular plants which underlie each respective grow light assembly. Of course these approaches are exemplary and in other embodiments other approaches may be used.

In the exemplary embodiment a fan 62 is in operative supported connection with the body 12. The fan 62 is configured to operate to move air through the interior area 14. An air inlet opening 64 extends through the body so as to enable operation of the fan to draw air into the interior area from the surroundings of the body 12 and exhaust air from the interior area. Although in the exemplary arrangement only one fan and one air inlet opening are shown, in other arrangements a plurality of fans and air inlet openings may be utilized.

In some exemplary arrangements the air inlet opening 64 is in operative connection with a duct 66. The duct 66 is configured to conduct air from an air induction opening 68 to the air inlet opening 62 to the interior area 14. In exemplary arrangements the air induction opening 68 to the duct 66 is positioned vertically lower than the air inlet opening. This may be done to increase the amount of carbon dioxide that is drawn into the interior area of the unit. By having the air drawn from a lower area, the amount of carbon dioxide which is heavier than the oxygen and nitrogen in the air, may be increased compared to having the air drawn from a higher vertical location.

In some exemplary arrangements the duct 66 or other air passage may include one or more oxygen absorbers schematically indicated 70. The oxygen absorbers may be of the iron type that capture oxygen from air entering the interior area. By capturing some of the oxygen that would otherwise enter the interior area the percentage amount of carbon dioxide in the air that enters the interior area may be increased. As plants generally use carbon dioxide for purposes of growth, increased levels of carbon dioxide will generally facilitate faster growth of plants. Of course it should be understood that this approach is exemplary and in other arrangements oxygen absorbers may not be used or other types of devices for increasing the carbon dioxide level within the interior area may be used.

Figure 6:
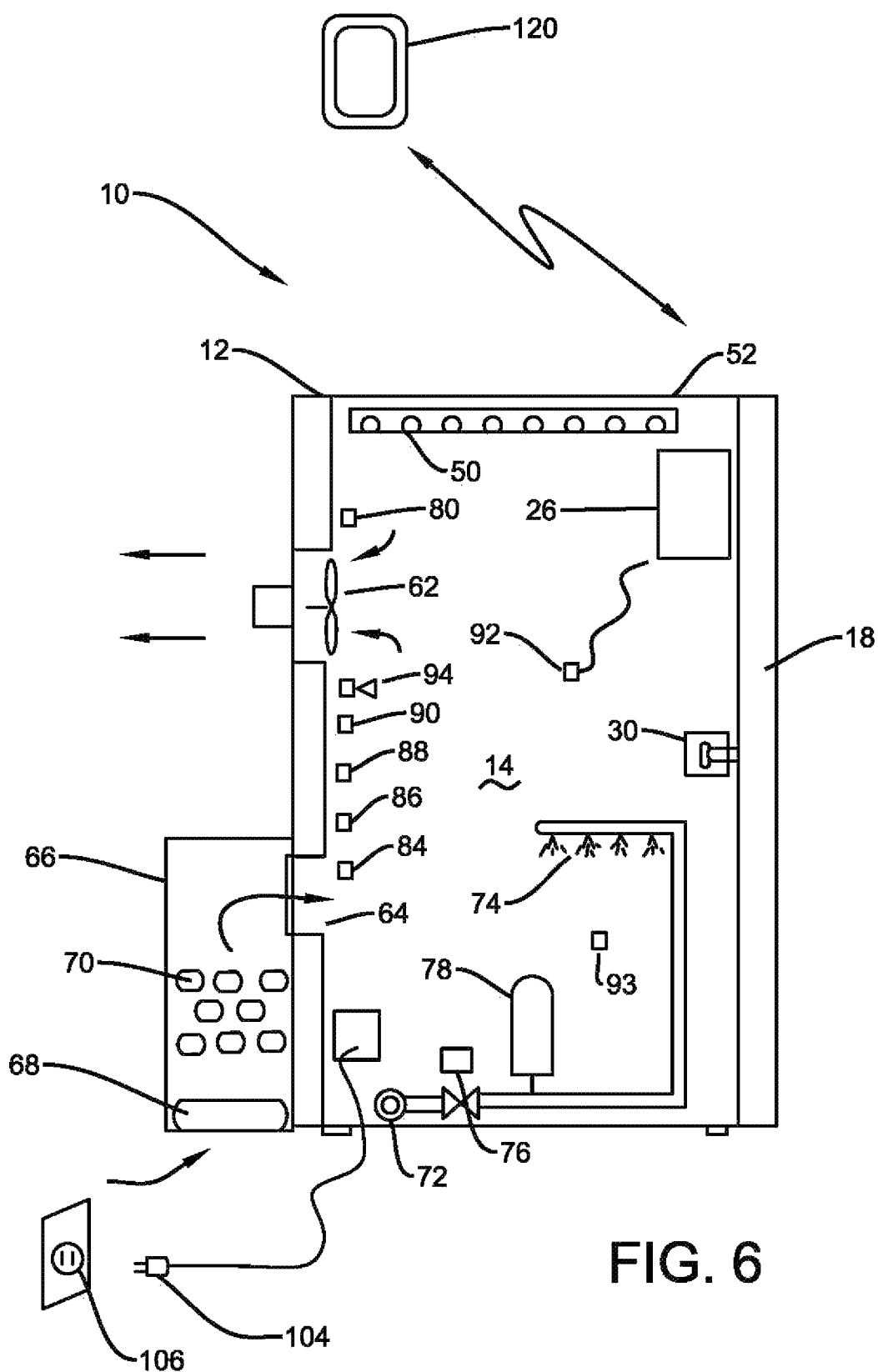
FIG. 6 is a side schematic view showing components of the exemplary plant grow unit.

In exemplary arrangements other features and components may be utilized to facilitate the growth of plants within the grow unit. This may include for example a system for selectively delivering water to the soil or other plant growing media in the trays or other locations in which the plants are grown. In an exemplary arrangement as shown in FIG. 6 the grow unit 10 is in operative connection with a water supply 72 such as a household water connection or a special treated water connection. A water manifold 74 which is operative to deliver water is positioned in the interior area 14 of the unit. In some exemplary arrangements the manifold 74 may include a flexible tube with outlets that can be selectively positioned in trays 58 or other suitable locations to deliver water for the growing plants. An electrically controlled valve 76 is positioned to control the flow of water from the water supply 72 to the manifold 74.

In some exemplary arrangements a refillable plant food container 78 may be positioned in operative connection with the manifold. In such arrangements the plant food container may house liquid fertilizer or other liquid or soluble plant food that may help facilitate the growth of plants. In some exemplary arrangements a venturi or similar nozzle may be utilized in the water line to draw the liquid plant food into the water line leading to the manifold 74 when water flows therethrough. Such an arrangement may be utilized to meter the flow of the plant food into the water that is delivered to the plants. Of course this approach is exemplary and in other arrangements no watering or plant feeding capabilities may be provided or alternative types of watering and/or plant feeding arrangements may be employed.

In some exemplary arrangements sensors may be utilized to determine conditions within the interior area 14. Signals from the sensors may also be utilized to control operations of the unit 10 so as to facilitate the growth of the plants therein.

In some exemplary embodiments the interior area may include a temperature sensor 80. The temperature sensor 80 is operative to sense the temperature in the interior area. In some exemplary arrangements a plurality of temperature sensors may be positioned in various areas within the interior area so as to detect temperatures in different locations. As represented in FIG. 10 the exemplary temperature sensors (or other types of sensors) may be operatively connected through wired releasable connectors 82. Such releasable connectors may be useful for purposes of replacing connectors within the unit.

Other types of sensors included in some exemplary arrangements may include an air flow sensor 84. The exemplary air flow sensor 84 may be operative to detect the rate of air flow in one or more locations in the interior area. The rate of air flow may be indicative of insufficient air flow as a result of a filter associated with the duct 66 becoming clogged or a failure of the fan 62 for example.

Other types of sensors that may be utilized in exemplary embodiments include an oxygen sensor 86. Oxygen sensor 86 may be usable to determine the concentration level of oxygen located in the interior area. A carbon dioxide sensor 88 may be used in some embodiments for purposes of detecting a concentration level of carbon dioxide within the interior area. In some embodiments a humidity sensor 90 may be included in the interior area. The humidity sensor may be useful for purposes of determining a humidity level to which the plants in the interior area are currently exposed.

In some exemplary arrangements one or more soil moisture sensors 92 may be included in the interior area. The soil moisture sensors 92 may be positioned in soil or other growing media located in the trays 58. The soil moisture sensors may be suitable for purposes of detecting whether the soil or other growing media has a suitable level of moisture therein to facilitate growth of the plants located in the trays. A soil pH sensor may also be included in some embodiments. An electronic aroma sensor may also be included in the interior area. These and other sensors schematically indicated 95 may be included in different exemplary embodiments.

Some exemplary arrangements may further include internal heaters 93 within the interior area. Heaters 93 may be included in the interior of the grow unit when the grow unit is positioned in a location where the ambient air may not be sufficiently warm to facilitate the desired plant growth within the unit. While in exemplary arrangements the grow lights 50 may provide a source of heat within the unit, in other arrangements supplemental heat may occasionally be required. Such heaters 93 may include resistance type heating elements, ceramic heating elements or other suitable type heating elements that provide suitable heat output for increasing the temperature within the volume of the interior area. Exemplary arrangements may further or alternatively include cooling devices, such as Peltier devices.

Other exemplary embodiments may include one or more cameras 94 in the interior area. Such cameras may be utilized for purposes of monitoring the plant growth that is occurring in the trays or other areas of the grow unit. In exemplary arrangements cameras may be positioned in multiple areas of the interior area so as to have fields of view that include the plant growth in the different trays. In some exemplary arrangements infrared cameras or other specialty cameras may be utilized for purposes of monitoring certain aspects of the plants that are being grown. Alternatively or in addition one or more cameras 94 may also be positioned so as to have a field of view which will capture the appearance features of individuals who access the interior area. Such features may be useful in cases where the grow unit houses valuable plants and the surveillance cameras may provide security to help prevent unauthorized access and theft.

It should be understood that many of these types of sensors and other devices discussed in connection with the exemplary embodiments may not be used in some types of grow units. Further exemplary grow units may include other arrangements in which different types of sensors or devices provide additional or different types of features from those described herein.

In the exemplary embodiment the operation of the grow unit is controlled by at least one control circuit schematically indicated 96. The exemplary control circuit 96 includes one or more circuits that are operative to communicate electrical signals with the various sensors and the other devices included in the unit. In the exemplary arrangement the at least one control circuit 96 includes at least one processor schematically indicated 98 and at least one data store schematically indicated 100. In exemplary arrangements the processor 98 may include a processor suitable for carrying out circuit executable instructions that are stored in the one or more associated data stores 100. The processor may include or may be in connection with a non-volatile storage medium including instructions that include a basic input/output system (BIOS). For example, the one or more processors may correspond to one or more of a combination of a CPU, FPGA, ASIC or other integrated circuit or other type of circuit that is capable of processing data and instructions.

The one or more data stores 100 may correspond to one or more volatile or nonvolatile memories such as random access memory, flash memory, magnetic memory, optical memory, solid-state memory or other devices that are operative to store circuit executable instructions and data. Circuit executable instructions that are executed by one or more processors may include instructions in any of a plurality of programming languages and formats including, without limitation, routines, subroutines, programs, threads of execution, scripts, objects, methodologies and functions which carry out the actions such as those described herein. Structures for processors may include, correspond to and utilize the principles described in the textbook entitled Microprocessor Architecture, Programming and Applications with the 8085 by Ramesh S. Gaonker (Prentice Hall, 2002), which is incorporated herein by reference in its entirety.

In exemplary embodiments control circuitry may include, for example, processors produced by Intel Corporation, Advanced Micro Devices or other entities. It should be understood that many types of processors may be used in suitable control circuits in exemplary arrangements.

The exemplary data stores used in exemplary embodiments may include any one or more of several types of mediums suitable for holding non-transitory circuit executable instructions. These may include, for example, magnetic media, optical media, solid-state media or other types of media such as RAM, ROM, PROM, flash memory, computer hard drives or any other form of media suitable for holding data and processor executable instructions. Further it should be understood that the exemplary control circuit may include other components such as hardware and/or software interfaces for communication with sensors and other types of devices.

In the exemplary arrangement the at least one control circuit includes a clock 102. The exemplary clock function 102 may include a processor based clock device suitable for determining time information which may be utilized for providing operational functions of the grow unit as hereinafter described.

In the exemplary arrangement the grow unit is powered by household current. The unit includes a connector 104 such as a plug that is suitable for connection to a supply of electrical power. The supply of electrical power may be a household power receptacle 106.

Further the exemplary embodiment includes one or more batteries 108. The batteries 108 provide a power supply backup so that the unit may operate even if power from the supply 106 is lost. A suitable switching device 110 is provided for enabling the unit to utilize battery power from the batteries 108 in the event that the supply of power from household current is lost. In the exemplary arrangement the circuitry associated with the unit includes a power sensor 112. The power sensor 112 is operative to monitor the availability of electrical power from the supply of household current. In the event that the normal supply of electrical power is interrupted, the power sensor 112 switches the unit to the battery power from battery 108. This assures that the unit maintains certain functions as operational or in some arrangements continues to operate in the usual manner at least for a limited period of time after the supply of household current is lost. Further as later discussed, this capability may enable providing notifications or other indications to the operator of the grow unit of the problem so that steps may be taken to avoid damage to the plants.

Figure 12:
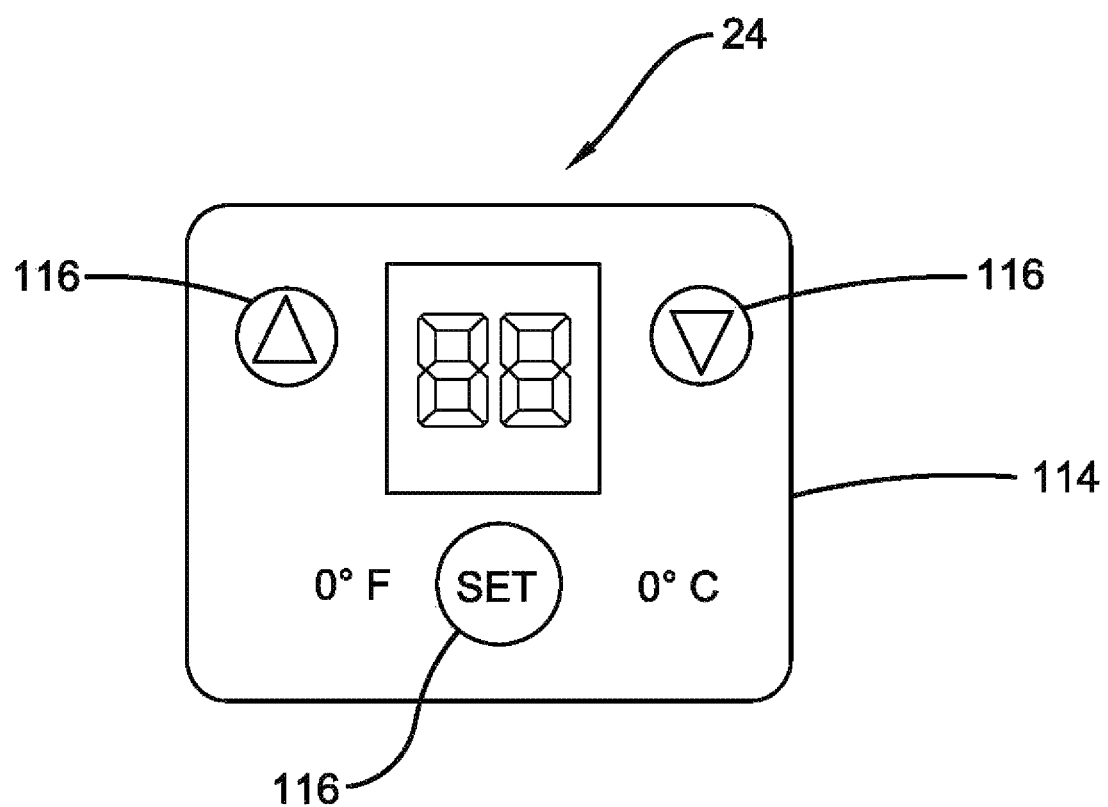
FIG. 12 is a view of the exemplary display and input devices used with the unit.

In an exemplary embodiment, the display 24 is associated with a user interface 114 as shown in FIG. 12. The exemplary user interface 114 includes a plurality of input devices 116. The exemplary input devices are manually actuatable buttons that are utilized to provide inputs to the at least one control circuit 96. In the exemplary user interface 114 the buttons include up arrow and down arrow buttons. The up arrow and down arrow buttons can be manually pressed to set a temperature indication that his output through the display 24. By pressing the arrow buttons the user can adjust the temperature output indication from the display, and when the desired internal area temperature is indicated, the user can press a set button. Pressing the set button causes the control circuit to operate the devices of the unit to attain and maintain the set temperature in the interior area 14. In the exemplary arrangement circuit executable instructions associated with the control circuit are operative to cause the temperature sensed by the sensor 80 to be output through the display except while the user is adjusting the set temperature. This enables the user to be able to observe the sensed internal temperature of the unit through the transparent window 22 of the door 18 during normal operational conditions. The exemplary user interface 114 further includes additional input devices that can be used to change the temperature indication that is output between Celsius and Fahrenheit scale readings. Of course it should be understood that this user interface is exemplary and in other embodiments other arrangements may be used and/or additional or different functionality may be provided.

For example, some user interfaces may be usable to selectively output indicia which is indicative of the values sensed by each of a plurality of different sensors. For example in embodiments that include an oxygen sensor, a carbon dioxide sensor, a humidity sensor, an air flow sensor, a soil pH sensor, an electronic aroma sensor and/or a soil moisture sensor, a user interface on the unit may be operative to output readings from each of the sensors. In some arrangements suitable input devices may be provided so that the user may selectively view the sensed readings from selected sensors by providing inputs to input devices. Such input devices may include tactile buttons or a touchscreen that is in operative connection with the display, for example. In some arrangements the touchscreen may be selectively operated and receive inputs responsive to touch contact with an external surface of the unit such as the external surface of the display or an external surface of the transparent window 22.

Further in some exemplary arrangements the at least one control circuit 96 may be in operative connection with a wireless interface 118. The wireless interface may be operative to communicate wireless messages indicative of the property and value sensed by one or more of the sensors included in the unit. The wireless signals may be communicated with a remote device 120 as represented in FIG. 6. In exemplary arrangements the remote device may comprise a portable tablet, smart phone or other remote computing device that enables the user to remotely monitor sensed conditions from sensors within the unit, as well as to provide inputs that adjust outputs that are provided from the display on the unit. Of course this arrangement is exemplary and in other embodiments other approaches may be used.

In addition the exemplary user interface 114 may provide outputs which indicate the status of devices included in the unit. Such outputs may indicate for example, the status or condition of certain devices to advise the user of the current operational state of the unit. For example outputs may indicate whether certain grow lights or grow light assemblies are currently operating or operational. Outputs may indicate whether the fan 62 is currently operating, and/or an indication of fan speed in cases where the fan speed is variable. Outputs may also indicate the current status of the valve 76 and whether it is supplying water to the manifold. In some cases water flow rate information may be detected by sensors and provided as outputs. Outputs may also indicate whether the heater 93 is currently operating in the unit. The outputs may also indicate the level of heating. Similar outputs may also be provided when the grow unit includes a cooling device. Outputs may also be provided to indicate whether the lock 30 is in the locked or unlocked condition. Other outputs may include indicating the status of the level of plant food within the plant food container of the unit. Other indications may include whether the door 18 of the unit is fully closed. Numerous different types of output indications may be provided from the user interface of exemplary embodiments.

Further in exemplary arrangements input devices associated with the user interface may be used to select the information that the user wishes to have output from the user interface. Different types of selected graphical buttons, icons or other input devices may be utilized so that the user may arrange the outputs from the user interface in a manner desired by the user. Alternatively or in addition, information on the status of the devices included in the unit may be wirelessly transmitted through the wireless interface to the user's remote device 120. An application operating on the remote device may be used for the user to view the status of the different devices within the plant grow unit. This may enable the user to monitor the status of the devices along with the sensed conditions to assure that the unit is operating properly. Alternatively or in addition the user may provide inputs through the remote device 120 to change the outputs that are provided through the user interface that is on the device.

In some exemplary arrangements the user interface on the grow unit and/or the remote device 120 may also be operated to control the devices within the unit. For example if the user determines that the conditions within the interior area need to be changed, the user may cause or change the operation of devices within the unit by providing inputs to the user interface and/or the remote device 120. For example if the user determines that the soil moisture as detected by the soil moisture sensor 92 is too low, the user can cause the valve 76 to be opened to add additional water to the soil or other media in which the plants are growing. If the user determines that the temperature within the unit is too high, the user can provide inputs which adjust the temperature in the unit. This may include for example providing inputs to the remote device 120 which cause the fan 62 to operate (or to operate at a higher speed) and lower the temperature within the unit.

Similarly for example, if the user determines that the conditions within the unit are too moist as determined from readings from the humidity sensor 90, the user may operate the fan to lower the humidity. Further the user may turn on or turn off one or more of the grow lights 50 through inputs through the remote device 120 that are communicated to the control circuit 96 through the wireless interface 118. It should be understood that these examples are merely representative of numerous different functions of exemplary plant grow units that the user may control through the interface on the unit and/or that can be remotely controlled by communication with the user's remote device.

In exemplary arrangements the user interface may also be utilized for purposes of programming the control circuit 96 for purposes of operating the device. This may include not only the desired internal temperature of the unit as previously mentioned, but other factors as well. These programmed parameters may include for example, the time periods during which the grow lights are to operate. Through inputs through the user interface the user may set the time and duration of grow light operation. In units that have multiple grow light assemblies the operational times for each such grow light assembly may be set separately.

In some exemplary arrangements the user interface on the unit or the remote device may be used to store in the at least one data store, other parameters that control operation of the unit. This may include for example the desired humidity within the interior area of the unit. In response to such a setting the control circuit may cause the fan to operate on a continuous, periodic or variable speed basis to maintain the humidity within the interior of the unit below a desired threshold or within a desired range as set through inputs by the user.

User inputs to the user interface may also cause the fan to operate on a timed basis. By having the fan operate at programmed times and/or at certain speeds, the interior area of the unit may undergo an air exchange. Such an air exchange will exhaust the air currently in the unit into the room and draw new air in. Other programmed parameters may cause the control circuit to operate to deliver water to the plants in response to the sensed level of soil moisture reaching a threshold. Similarly the introduction of water to the soil may be stopped when another program threshold is reached.

Figure 7:
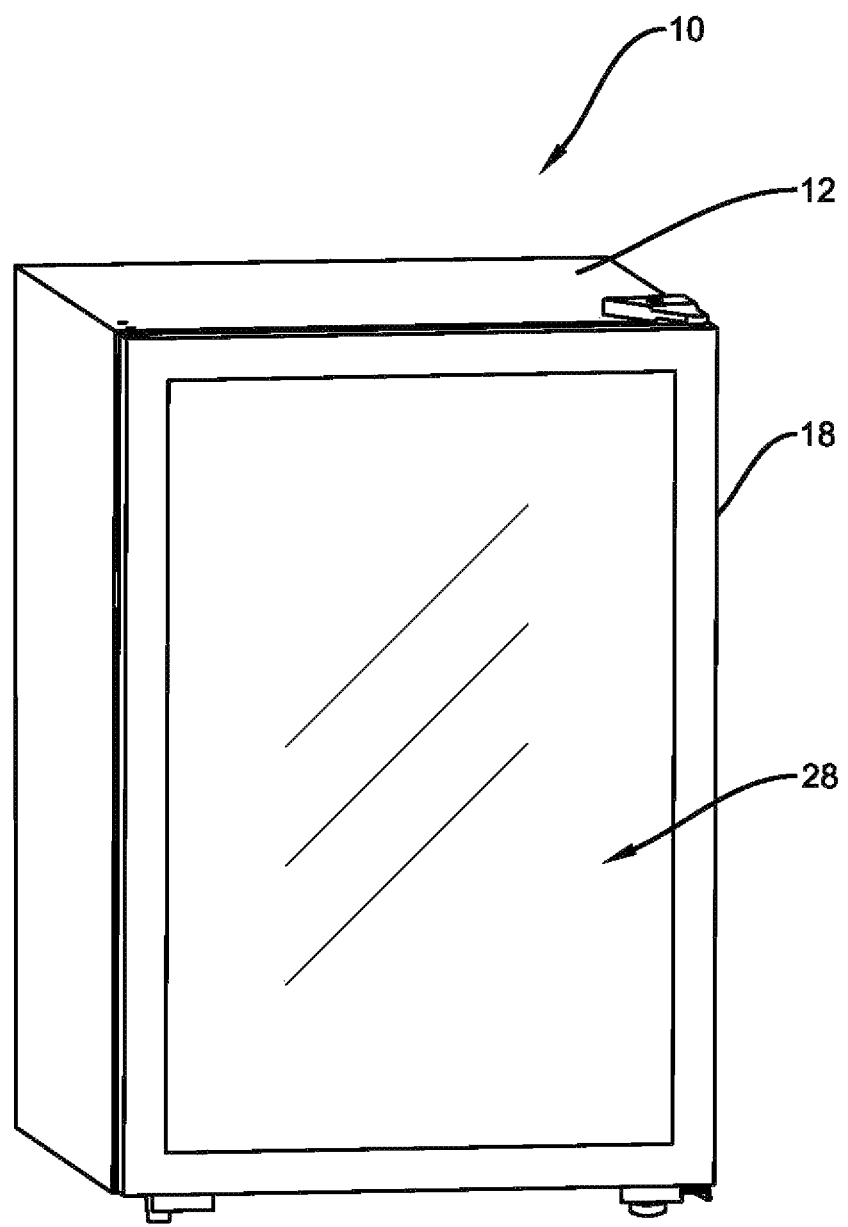
FIG. 7 is a perspective view of the plant grow unit similar to FIG. 1 but with the transparency panel in a non-transparent condition.

Other program parameters may relate to operating the fan or taking other steps in response to detecting that levels of carbon dioxide or oxygen are at programmed thresholds. The control circuit may also be programmed to have the transparency panel 28 be in the transparent condition (as shown in FIG. 1) during certain time periods and to change to the nontransparent condition (as shown in FIG. 7) during other time periods. The control circuit may also be programmed with instructions that cause the cameras to operate to capture images under certain circumstances. For example input instructions may cause the cameras to operate to capture images of the plants on a periodic basis and store the data corresponding to the images in the at least one data store. Alternatively or in addition, program instructions may be operative to cause the cameras to capture image data when certain things occur such as when the door is in an open condition. Other instructions may cause an alert message and/or image data from the cameras to be transmitted through the wireless interface to the user's remote device during certain conditions such as when the door is open or if the unit is detected by a seismic sensor or GPS sensor circuit as being moved. Of course it should be understood that these programmed instructions which can be input to the user interface are exemplary of numerous such instructions that may be implemented.

Alternatively such programming may be accomplished in some exemplary embodiments through inputs from the user's remote device 120. An application operating on the remote device may be utilized to input program parameters which are wirelessly transmitted to the unit and stored in the at least one data store associated with the control circuit. Such capabilities may enable the user to remotely change the operating parameters for the grow unit based on the monitored conditions and other information that is available to the user concerning the status of the plants or of the grow unit.

In exemplary arrangements the at least one control circuit associated with the unit may operate to cause programmed activities and functions to be performed. For example, the data store associated with the control circuitry may include instructions which cause the control circuitry to operate the grow lights during defined time periods. This is based on the programmed instructions and the operation of the clock associated with the control circuitry.

The control circuitry may also operate to maintain the temperature within the interior area at or below or above a set temperature. For example, the control circuitry may operate to sense the temperature within the interior area based on signals from the temperature sensor. The control circuitry then operates to compare the sensed temperature to at least one programmed maximum threshold temperature. Responsive to the sensed temperature in the interior area rising to the threshold the control circuitry operates to cause the fan to operate. Operation of the fan causes air from the area of the body to be drawn into the unit (or to draw more air into the unit) which will generally cool the interior area. The fan will operate in accordance with the programmed instructions until the interior area is cooled sufficiently based on comparison of the sensed temperature to the threshold and then the control circuitry will shut off (or slow down) the fan. In some arrangements the circuitry may operate to shut off the grow lights until the interior area is cooled to the desired temperature. In alternative arrangements the control circuitry may operate to maintain the temperature within a desired range. This may involve the control circuitry causing the fan to operate (or increase fan speed) when the sensed temperature is a programmed amount such as 1° above the set temperature, and continue operation of the fan until the temperature in the interior area has dropped a programmed amount such as 2° below the set temperature. The control of temperature within the range avoids unnecessary frequent operation (or high speed operation) of the fan. Of course these approaches are exemplary.

In some exemplary arrangements the at least one data store associated with the control circuit may be operative to cause the fan to operate for a programmed time on a periodic basis. In such arrangements based on the operation of the clock, the control circuit will cause the fan to operate (or operate at a higher speed) for a programmed time so as to cause air to flow through the interior area. Once the programmed time has been reached the control circuit will operate to cause the fan to cease operation (or to operate at a slower speed). This approach may be done to change the air within the interior area periodically.

In exemplary arrangements the programming associated with the control circuit may cause the fan to operate responsive to signals of sensed conditions from other sensors. This may include signals from the oxygen sensor, and the carbon dioxide sensor, or the humidity sensor. The control circuit may cause the fan to operate to maintain the readings from the sensors within programmed thresholds or ranges. In some exemplary arrangements the programming associated with the control circuit may operate the fan at variable speeds in order to achieve the desired change in sensed condition. For example if the sensed condition is further from the desired set programmed parameter, and operation of the fan at a higher speed and air flow rate will tend to bring the condition closer to that desired more quickly, then the programming will cause the fan to be operated at the higher flow rate. Likewise when a lower fan air flow rate is more appropriate to achieve the desired condition the programming will cause the fan to operate at lower speed and air flow rate. Further in exemplary arrangements, the control circuitry also senses the flow rate achieved by the fan operation based on signals from the air flow sensor. If the air flow sensor is indicating for example, a lower air flow rate despite a relatively high fan speed, the control circuitry will operate in accordance with its programming to compensate and increase the fan speed to achieve a higher air flow rate. The control circuit may also operate to output an alarm indication through the user interface or a wireless signal to the remote device of a possible blocked filter or other abnormal condition. Of course these approaches are exemplary and in other embodiments other approaches may be used.

Further in exemplary embodiments programming associated with the control circuit may be operative to control the condition of the lock. For example in some exemplary arrangements the data store may be programmed to include biometric data for a user (or users) who is authorized to access the interior area. Such biometric data may include information corresponding to a user's thumbprint, for example. Responsive to the biometric sensor sensing a thumb adjacent to the sensor, the control circuit is operative to cause the sensor to operate to capture the biometric data. The control circuit is then operative to compare the captured data to the data stored in the data store for the authorized user. If the captured data corresponds to the stored data, the control circuit is operative to change the condition of the lock from the locked condition to the unlocked condition. Such data may alternatively include other types of biometric data, or other types of used input data or combinations thereof.

In other exemplary arrangements programmed data included in the at least one data store may correspond to time periods in which the lock is to be in the locked and/or unlocked condition. Responsive to the stored data and the clock, the control circuit is operative to change the condition of the lock to correspond to the desired condition during the corresponding periods. In some exemplary arrangements the condition of the transparency panel may also change with the condition of the lock. That is for example, the transparency panel may be transparent when the lock is in the unlocked condition, and may be nontransparent when the lock is in the locked condition. Of course this approach is exemplary and in other arrangements the transparency panel may be operated in accordance with programmed instructions which cause it to change its condition based on other conditions.

In some exemplary arrangements the control circuitry is programmed to enable an authorized user to change the condition of the lock by communication through the wireless interface. In such arrangements the programming stored in the data store provides for a requirement that the unit receive authentication data from the remote device which enables the control circuit to determine that the wireless communications are from an authorized user. Such authentication data may include password data, biometric data, cryptographic keys or digital signatures, or other information which identifies the received wireless signals as originating with an authorized user. Responsive to the control circuit making a determination that the communication is from an authorized user, the control circuit will operate in accordance with its programming to enable the condition of the lock to be changed by the user operating the remote device.

Of course as previously discussed, other aspects of operation and monitoring of the grow unit may be controlled remotely as well. Such authentication features for communications from the remote unit may be applied in varying degrees depending on the nature of the functions that are sought to be remotely controlled. Of course these approaches are exemplary and in other embodiments other approaches may be used.

The exemplary control circuit may also operate in accordance with the stored program instructions and data to control other functions of the unit. This may include the functions associated with causing water and/or plant food to be delivered to the plants responsive to sensed conditions. Also in addition to controlling the temperature in the interior area of the unit by operating the fan in accordance with programmed instructions, heaters such as the supplemental heaters 93 previously discussed or electronic cooling devices may also be operated. Numerous different programmed capabilities may be provided for different embodiments of plant grow units depending on the particular devices that are included therein.

Exemplary embodiments may also be operative to give local and remote indications of sensed conditions which occur at the unit. For example in the event that the unit loses its connection to the supply of household electrical power, the control circuitry may operate responsive to the battery to provide a local output from the display of the user interface to indicate that the unit has lost power. Alternatively or in addition the control circuit may also operate to cause the wireless interface to provide wireless messages to the user's remote device to report the condition. The unit may also be programmed to provide local outputs and wireless signals to indicate when power is restored.

The exemplary control circuit may also operate in accordance with its programming to provide other local or remote indications of certain conditions. Such conditions may include detected conditions indicative of a malfunction of the grow lights. It may also include detection of abnormal temperature, moisture, pH, aroma or other conditions. Detected conditions may also include detection of attempts at unauthorized access to the interior area, such as attempts by unauthorized persons to open the door, or movement of the grow unit.

In exemplary arrangements the control circuitry may also be operative to cause signals to be sent from the wireless interface to the user's remote device that include not only an indication of a condition but also additional data. Such data may include images captured by the cameras or other sensors which may be useful to the operator in evaluating the condition. The user can then provide instructions to the remote device as appropriate for purposes of addressing the condition that is detected. Of course it should be understood that numerous different approaches may be taken to monitor and control the operation of exemplary grow units.

Thus the exemplary embodiments achieve improved operation, eliminate difficulties encountered in the use of prior devices and systems, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the useful features are not limited to the exact features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description, or mere equivalents thereof.

Having described the features, discoveries and principles of the exemplary embodiments, the manner in which they are constructed and operated and the advantages and useful results attained, the new and useful structures, devices, elements, arrangements, parts, combinations, systems, equipment, operations, methods, processes and relationships are set forth in the appended claims.

We claim:

1. Apparatus comprising:
   a plant grow unit including
      a body,
         wherein the body bounds an interior area,
         wherein the body includes an opening to the interior area,
         wherein the body further includes an air inlet opening from outside the body to the interior area
      a door,
         wherein the door is movably mounted in operative connection with the body,
         wherein the door is movable between a closed position in which the door covers the opening, and an open position in which the door is disposed away from the opening and the interior area is accessible from outside the body through the opening,
      at least one grow light, wherein the at least one grow light is positioned in the interior area,
      a fan,
         wherein operation of the fan is operative to cause air outside the body to be drawn into the interior area,
      a duct, wherein the duct extends external of the body and is in fluid connection with the air inlet opening,
         wherein the duct extends to an air induction opening vertically below the air inlet opening,
      a temperature sensor, wherein the temperature sensor is positioned in the interior area,
      at least one control circuit, wherein the at least one control circuit includes
         a clock, and
         at least one data store,
      wherein the at least one control circuit is in operative connection with the at least one grow light, the fan, and the temperature sensor,
      wherein the data store includes control circuit executable instructions, wherein the at least one control circuit is operative responsive at least in part to the circuit executable instructions to cause
         the at least one grow light to operate during at least one time period responsive at least in part to the clock,
         a sensed temperature in the interior area to be determined responsive to the temperature sensor,
         the sensed temperature to be compared to at least one threshold,
         the fan to operate to maintain the sensed temperature in the interior area at no greater than the at least one threshold.

2. The apparatus according to claim 1
wherein the interior area is bounded by a pair of opposed side walls,
   wherein each of the side walls includes a plurality of vertically spaced projections or recesses,
   wherein the projections or recesses are configured to releasably engage at least one horizontally extending shelf, wherein the at least one shelf is selectively vertically positionable in the interior area in operative engagement with at least one projection or recess.

3. The apparatus according to claim 1
wherein the interior area is bounded by a pair of opposed side walls,
   wherein each of the side walls includes a plurality of vertically spaced projections or recesses,
   wherein the projections or recesses are configured to releasably engage at least one horizontally extending shelf, wherein the at least one shelf is selectively vertically positionable in the interior area in operative engagement with at least one projection or recess,
   wherein the interior area includes a top wall, wherein the at least one grow light is in supported operative connection with the top wall,
   wherein the at least one shelf is selectively vertically positionable a distance away from the at least one grow light.

4. The apparatus according to claim 1
wherein the interior area is bounded by a pair of opposed side walls,
   wherein each of the side walls include a plurality of vertically spaced projections or recesses,
   wherein the projections or recesses are configured to releasably engage at least one horizontally extending shelf, wherein the at least one shelf is selectively vertically positionable in the interior area in operative engagement with at least one projection or recess,
   wherein the at least one grow light is selectively vertically positionable in the interior area by operative engagement with at least one projection or recess.

5. The apparatus according to claim 4
wherein the interior area includes a plurality of grow lights disposed at different vertical locations in the interior area, and
a plurality of shelves located in the interior area, wherein each shelf is selectively vertically positionable relative to a respective grow light.

6. The apparatus according to claim 1
wherein the at least one control circuit is operative to cause the fan to operate during time periods responsive at least in part to the clock,
whereby air in the interior area is periodically changed.

7. The apparatus according to claim 1
and further including
an oxygen sensor, wherein the oxygen sensor is in the interior area and is in operative connection with the at least one control circuit,
wherein the at least one control circuit is operative to cause the fan to operate responsive at least in part to the oxygen sensor.

8. The apparatus according to claim 1
and further including
a carbon dioxide sensor, wherein the carbon dioxide sensor is in the interior area and is in operative connection with the at least one control circuit,
wherein the at least one control circuit is operative to cause the fan to operate responsive at least in part to the at least one carbon dioxide sensor.

9. The apparatus according to claim 1
and further including
a humidity sensor, wherein the humidity sensor is in the interior area and is in operative connection with the at least one control circuit,
wherein the at least one control circuit is operative to cause the fan to operate responsive at least in part to the humidity sensor.

10. The apparatus according to claim 1
and further including
an air flow rate sensor, wherein the air flow rate sensor extends in the interior area and is in operative connection with the at least one control circuit,
wherein the at least one control circuit is operative to control at least one of fan speed and duration of fan operation responsive at least in part to the air flow rate sensor.

11. The apparatus according to claim 1
wherein the door includes a transparent window, wherein the interior area is viewable from outside the body through the transparent window with the door in the closed position.

12. The apparatus according to claim 1
wherein the door includes a transparent window, wherein the interior area is viewable from outside the body through the transparent window with the door in the closed position,
an electrically changeable transparency panel in generally overlapping relation with the window,
wherein the transparency panel is in operative connection with the at least one control circuit,
wherein the transparency panel is selectively operative responsive to the at least one control circuit to change between a transparent condition and a nontransparent condition.

13. The apparatus according to claim 1
and further including
an electrically controlled lock, wherein the lock is in operative connection with the at least one control circuit,
   wherein the lock is changeable responsive at least in part to the at least one control circuit between a locked condition in which the lock is operative to hold the door in the closed position, and an unlocked condition in which the door is enabled to be moved from the closed position to the open position.

14. The apparatus according to claim 13
and further including
a wireless interface in operative connection with the at least one control circuit,
wherein the at least one control circuit is operative to cause
   the wireless interface to send wireless signals corresponding to a condition of at least one of
      the lock,
      the temperature sensor,
      the fan,
      the at least one grow light, and a change in a condition of at least one of
the lock,
the fan,
the at least one grow light,
responsive to at least one wireless signal received through the wireless interface.
15. The apparatus according to claim 1
and further including
an electrically controlled lock, wherein the lock is in operative connection with the at least one control circuit,
wherein the lock is changeable responsive at least in part to the at least one control circuit between a locked condition in which the lock is operative to hold the door in the closed position, and an unlocked condition in which the door is enabled to be moved from the closed position to the open position,
a biometric sensor, wherein the biometric sensor is operative to sense at least one biometric feature of a user adjacent to the body,
wherein the biometric sensor is in operative connection with the at least one control circuit,
a wireless interface, wherein the wireless interface is in operative connection with the at least one control circuit and is operative to communicate wireless signals,
wherein the at least one control circuit is operative to cause the lock to be changed between the locked and unlocked conditions responsive at least in part to at least one of
the clock,
the biometric sensor,
communication signals received through the wireless interface.
16. The apparatus according to claim 1
and further including
at least one of a soil moisture sensor and a soil pH sensor wherein the at least one of the soil moisture sensor and soil pH sensor is located in the interior area and is in operative connection with the at least one control circuit,
an output device, wherein the output device is in operative connection with the at least one control circuit,
wherein the at least one control circuit is operative to cause the output device to provide at least one output responsive to at least one of a sensed soil moisture level and a sensed soil pH level.
17. The apparatus according to claim 1
and further including
a soil moisture sensor, wherein the soil moisture sensor is located in the interior area and is in operative connection with the at least one control circuit,
a water delivery manifold, wherein the water delivery manifold extends in the interior area and is configured to be in operative connection with a water supply,
an electrically controlled water valve in operative connection with the water delivery manifold, wherein the valve is changeable between a flow condition in which water is delivered to the interior area through the manifold, and a no flow condition in which water is not delivered to the interior area through the manifold,
wherein the valve is in operative connection with the at least one control circuit, wherein the at least one control circuit is operative responsive at least in part to a sensed soil moisture level to cause the valve to change between the flow condition and the no flow condition.
18. The apparatus according to claim 1
and further including
a soil moisture sensor, wherein the soil moisture sensor is located in the interior area and is in operative connection with the at least one control circuit,
a water delivery manifold, wherein the water delivery manifold extends in the interior area and is configured to be in operative connection with a water supply,
an electrically controlled water valve in operative connection with the water delivery manifold, wherein the valve is changeable between a flow condition in which water is delivered to the interior area through the manifold, and a no flow condition in which water is not delivered to the interior area through the manifold,
wherein the valve is in operative connection with the at least one control circuit,
wherein the at least one control circuit is operative responsive at least in part to a sensed soil moisture level to cause the valve to change between the flow condition and the no flow condition,
a refillable plant food holding container in operative connection with the body, wherein the refillable plant food container is in fluid connection with the water manifold,
wherein the water manifold is operative to deliver plant food from the container through the manifold.
19. The apparatus according to claim 1
wherein the body further includes an air inlet opening from outside the body to the interior area,
wherein operation of the fan is operative to cause air outside the body to be drawn into the interior area,
and further including an oxygen absorber, wherein the oxygen absorber is in operative connection with the inlet opening,
wherein the oxygen absorber is operative to reduce oxygen in the air entering the interior area.
20. The apparatus according to claim 1
and further including
at least one heater other than the at least one grow light, wherein the at least one heater is in operative connection with the interior area,
wherein the heater is in operative connection with the at least one control circuit,
wherein the at least one control circuit is operative to cause the at least one heater to operate to increase the interior area temperature responsive at least in part to at least one temperature sensed in the interior area by the temperature sensor.
21. The apparatus according to claim 1
and further including
a connector, wherein the connector is releasably connectable to a supply of electricity,
a power sensor, wherein the power sensor is in operative connection with the connector, and wherein the power sensor is operative to determine when the connector is not connected to the supply,
a battery,
wherein the connector and the battery are each in operative connection with the at least one control circuit, a wireless interface, wherein the wireless interface is in operative connection with the at least one control circuit, wherein the at least one control circuit is operative to cause responsive at least in part to the power sensor sensing loss of power from the supply, the at least one control circuit to operate responsive to power delivered from the battery, the wireless interface to communicate signals that the connector is not connected to the supply.

22. The apparatus according to claim 1
and further including
a display, wherein the display is in operative connection with the at least one control circuit,
wherein the display is operative to output indicia indicative of a condition of at least one of
the temperature sensor,
the at least one grow light, and
the fan.

23. The apparatus according to claim 22
wherein the display is located in the interior area,
wherein the door includes a transparent window,
wherein the display is visible through the transparent window when the door is in the closed position.

24. The apparatus according to claim 22
and further including
at least one further sensor including at least one of
an oxygen sensor,
a carbon dioxide sensor,
a humidity sensor, and
an air flow rate sensor,
wherein the at least one further sensor is located in the interior area and is in operative connection with the at least one control circuit,
wherein the at least one control circuit is operative to cause at least one of
the fan to operate responsive at least in part to the at least one further sensor,
indicia corresponding to a condition sensed by the at least one further sensor to be output through the display.

25. The apparatus according to claim 24
and further including
an oxygen absorber, wherein the oxygen absorber is in operative connection with the inlet opening and is operative to reduce oxygen in air entering the interior area.

26. The apparatus according to claim 25
wherein the door includes a transparent window, wherein the interior area is viewable from outside the body through the transparent window with the door in the closed position,
an electrically changeable transparency panel in generally overlapping relation with the window, and wherein the transparency panel is in operative connection with the at least one control circuit,
wherein the transparency panel is selectively operative responsive to the at least one control circuit to change between a transparent condition and a nontransparent condition.

27. The apparatus according to claim 26
and further including
an electrically controlled lock, wherein the lock is in operative connection with the at least one control circuit,
wherein the lock is changeable responsive at least in part to the at least one control circuit between a locked condition in which the lock is operative to hold the door in the closed position, and an unlocked condition in which the door is enabled to be moved from the closed position to the open position,
and further including at least one of
a biometric sensor, wherein the biometric sensor is operative to sense at least one biometric feature of a user adjacent to the body, wherein the biometric sensor is in operative connection with the at least one control circuit,
a wireless interface, wherein the wireless interface is in operative connection with the at least one control circuit and is operative to communicate wireless signals,
wherein the at least one control circuit is operative to cause the lock to be changed between the locked and unlock conditions responsive at least in part to at least one of
the clock,
the biometric sensor, and
communication signals received through the wireless interface.

28. The apparatus according to claim 27
and further including
a soil moisture sensor, wherein the soil moisture sensor is located in the interior area and is in operative connection with the at least one control circuit,
wherein the at least one control circuit is operative to cause at least one of
indicia corresponding to soil moisture detected by the soil moisture sensor to be output through the display,
wireless communications including data corresponding to soil moisture to be communicated through the wireless interface.

29. The apparatus according to claim 28
in further including
a water delivery manifold, wherein the water delivery manifold is configured to deliver water into the interior area and is configured for operative connection to a water supply,
an electrically controlled valve, wherein the valve is selectively operative to control the delivery of water from the supply to the interior area through the manifold, and wherein the valve is in operative connection with the at least one control circuit,
wherein the at least one control circuit is selectively operative responsive at least in part to the soil moisture sensor to cause the valve to enable the delivery of water through the manifold from the supply to the interior area.

30. The apparatus according to claim 29
and further including
a refillable plant food container, wherein the refillable plant food container is in operative connection with the manifold,
wherein the manifold is operative to deliver plant food from the container through the manifold.

31. The apparatus according to claim 30
wherein the interior area is bounded by a pair of opposed side walls,
wherein each of the side walls includes a plurality of vertically spaced projections or recesses,
wherein the projections or recesses are configured to releasably engage at least one horizontally extending shelf, wherein the at least one shelf is selectively vertically positionable in the interior area in operative engagement with at least one projection or recess,
wherein the at least one grow light is selectively vertically positionable in the interior area by operative engagement with at least one projection or recess.

32. The apparatus according to claim 31
and further including
a connector, wherein the connector is releasably connectable to a supply of electricity,
a power sensor, wherein the power sensor is in operative connection with the connector, and wherein the power sensor is operative to determine when the connector is not connected to the supply,
a battery,
wherein the connector and the battery are each in operative connection with the at least one control circuit,
wherein the at least one control circuit is operative to cause
responsive at least in part to the power sensor sensing loss of power from the supply, the least one control circuit to be operative responsive to power delivered from the battery,
the wireless interface to communicate signals indicative that the connector is not connected to the supply.

33. The apparatus according to claim 32
wherein the at least one control circuit is operative to cause at least one of the wireless interface to send wireless signals corresponding to a condition of at least one of
the temperature sensor,
the power sensor,
the oxygen sensor,
the carbon dioxide sensor,
the humidity sensor,
the air flow rate sensor,
the transparency panel,
the soil moisture sensor,
the fan,
the lock,
the biometric sensor,
the valve,
the at least one grow light, and
control responsive at least in part to wireless signals received through the wireless interface, a condition of at least one of
the transparency panel,
the at least one grow light,
the fan,
the lock,
the valve.

* * * * *